United States Patent [19]

McCumber

[11] 3,833,267
[45] Sept. 3, 1974

[54] LINER AND PROCESS FOR COMBATING WEAR IN PNEUMATIC TRANSPORT SYSTEMS

[75] Inventor: Ralph David McCumber, Mexico, Mo.

[73] Assignee: A. P. Green Refractories Co., Mexico, Mo.

[22] Filed: Nov. 30, 1972

[21] Appl. No.: 310,994

[52] U.S. Cl. .................................... 302/64, 138/99
[51] Int. Cl. ............................................ B65q 53/52
[58] Field of Search ............ 138/99, 110, 139, 153, 138/172, 178; 302/64

[56] References Cited
UNITED STATES PATENTS

| 785,176 | 3/1905 | Mommertz | 302/64 X |
| 1,727,038 | 9/1929 | Rousey | 138/99 X |
| 2,177,128 | 10/1939 | Johnson | 138/110 |
| 3,451,434 | 6/1969 | Bauer | 138/172 |

FOREIGN PATENTS OR APPLICATIONS

| 300,126 | 2/1929 | Great Britain | 302/64 |
| 1,084,312 | 9/1967 | Great Britain | 138/99 |
| 648,581 | 1/1951 | Great Britain | 138/99 |
| 146,768 | 1/1903 | Germany | 138/110 |

*Primary Examiner*—Evon C. Blunk
*Assistant Examiner*—W. Scott Carson
*Attorney, Agent, or Firm*—Gravely, Lieder & Woodruff

[57] ABSTRACT

An elbow in a pneumatic transport system is lined on the outside to combat wear from abrasive substances conveyed by the system. The lining comprises a plurality of liner segments extended only across the backside of the elbow's exterior surface and set end to end along the elbow in the directon of flow through it. The liner segments are attached to the elbow by an adhesive and by steel bands. The opposing end faces of adjacent liner segments are generally parallel and a layer of adhesive exists between them. The liner segments are preformed from a durable material such as aluminum oxide.

8 Claims, 6 Drawing Figures

PATENTED SEP 3 1974　3,833,267
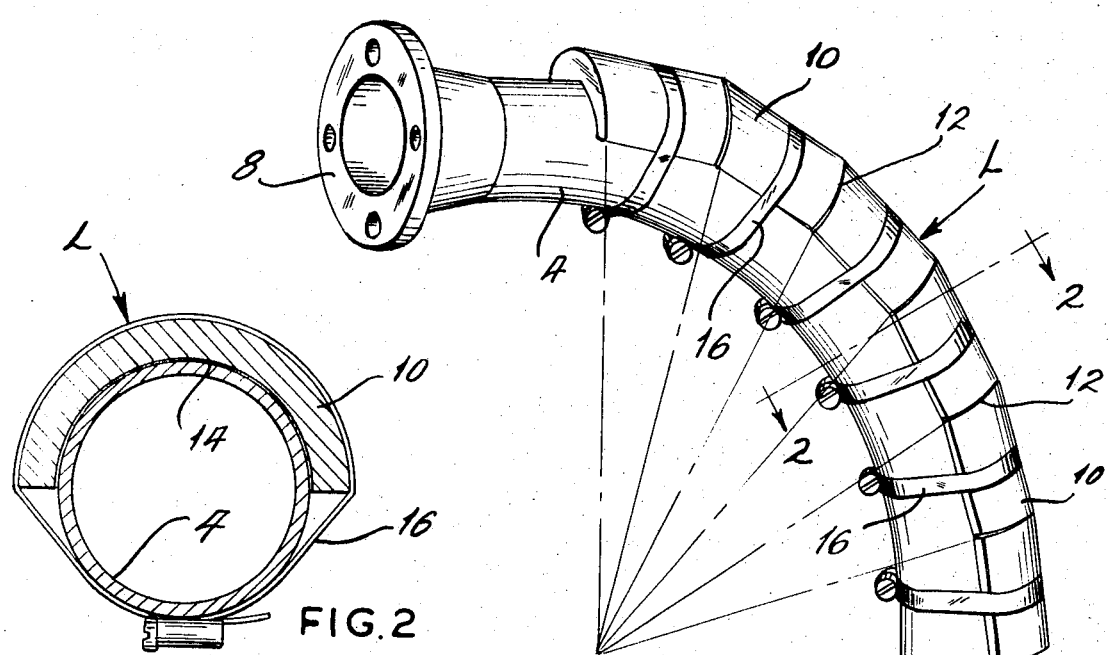
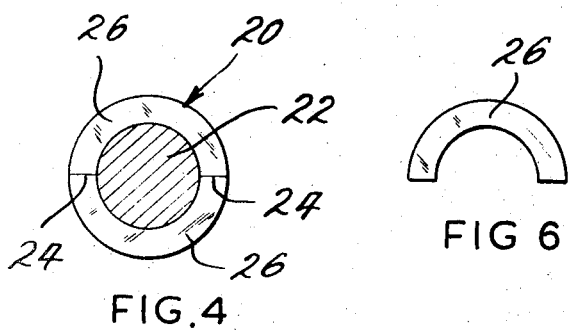
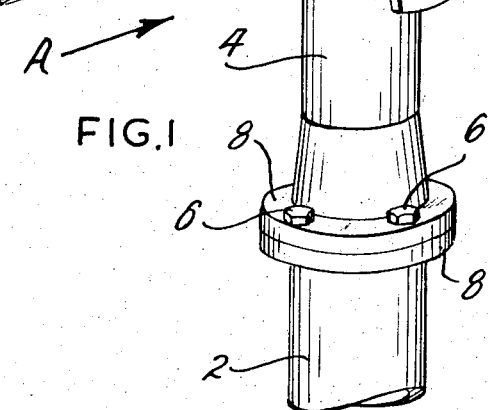
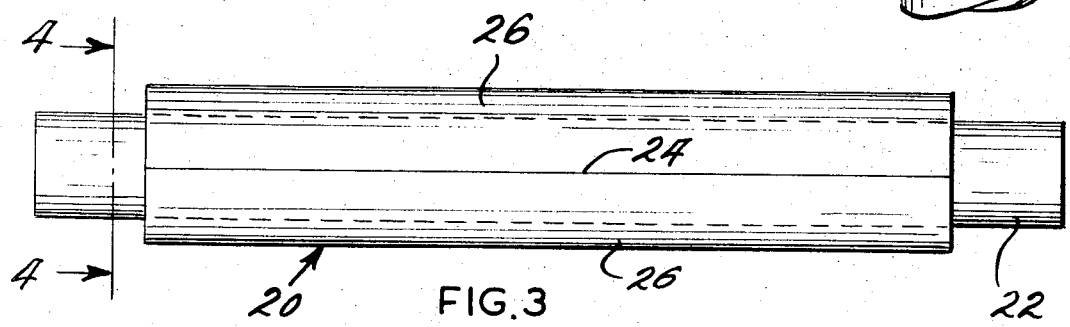
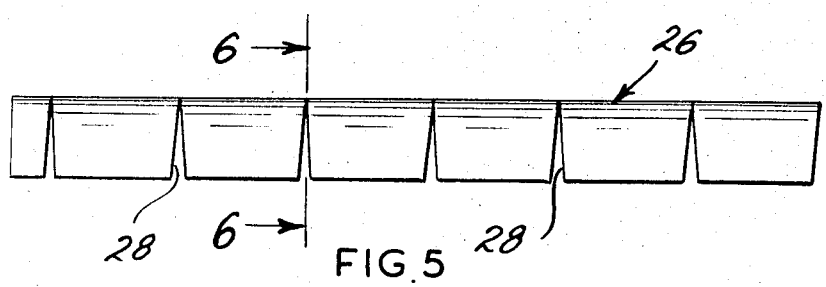

LINER AND PROCESS FOR COMBATING WEAR IN PNEUMATIC TRANSPORT SYSTEMS

BACKGROUND OF THE INVENTION

This invention relates in general to pneumatic transport systems and more particularly to a process and liner for combating wear in such systems.

Pneumatic transport systems rely on relatively high velocity airstreams for conveying materials. Usually the airstream is confined within a pipe or duct and the material is entrained in the airstream. Insofar as fine or pulverant material is concerned, these systems offer distinct advantages over more conventional systems such as elevators and conveyors, since the conveyed materials are completely confined and therefore will not create any dust. Moreover, the confinement afforded by these systems reduces the possibility of the transported material being contaminated, and this is particularly important where the transported material is a food product such as wheat or flour.

Pneumatic transport systems of current design and construction are not suitable for conveying abrasive substances, or substances harder than the pipe or duct through which the substances move, due to the fact that the abrasive substances tend to abrade and wear out elbows and other curved sections of pipe quite rapidly. In particular, the abrasive material in the airstream impinges against the backside of the elbow as the airstream turns the corner, and this impingement wears down the material of the pipe. Indeed, elbows have been known to wear out in as little as two to three days. Normally, wear is minimal in straight sections of pipe, particularly where the straight sections are oriented vertically, for in vertical pipe the material more or less rides on a cushion of air. Some wear does occur in straight sections immediately ahead of elbows.

Heretofore attempts have been made to combat wear in elbows. One way is to install ceramic or rubber liners inside the elbow, but this requires oversize elbows which are difficult to join with the remaining sections of pipe in the system. Another way is to use ni-hard or cast iron elbows, but this requires installing entirely new and considerably more expensive elbows. Still another is to encase the elbow in concrete, but this requires the erection of a form around the elbow to receive the concrete which is poured into it.

SUMMARY OF THE INVENTION

One of the principal objects of the present invention is to provide a liner for extending the life of pipes in pneumatic transport systems. Another object is to provide a liner which is simple in construction, easy to manufacture, and easy to install on pipes. A further object is to provide a liner which is fitted against the exterior surface of a pipe and hence is installed without dismantling the transport system. An additional object is to provide a process for installing a liner of the type described on pipes of pneumatic transport systems. These and other objects and advantages will become apparent hereinafter.

The present invention is embodied in a process for protecting pipe in pneumatic transport systems by applying a preformed liner to the backside of a curved section of the pipe. The invention also resides in the liner itself. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a perspective view of a pipe having an elbow fitted with a liner constructed in accordance with and embodying the present invention;

FIG. 2 is a sectional view taken along lines 2—2 of FIG. 1;

FIG. 3 is an elevational view showing a mandrel with an abrasive resistant material molded about it;

FIG. 4 is an end view showing the mandrel and abrasive resistant material;

FIG. 5 is a side elevational view of a semi-circular tubular section which has been removed from the mandrel and slit transversely to form liner segments, and FIG. 6 is an end view of one of the liner segments.

DETAILED DESCRIPTION

Referring now to the drawings, A designates a pneumatic transport system including (FIG. 1) a straight section of pipe 2 and an elbow 4 which are connected by means of bolts 6 extended through flanges 8 on the ends of the pipe 2 and elbow 4. The elbow 4 is, of course, a curved section of pipe. It is conventional and possesses inside and outside diameters equalling those of the straight section of pipe 2. The pipe 2 and elbow 4 confine a high velocity airstream in which conveyed material is entrained, and as this entrained material passes through the elbow 4 it impinges against the backside thereof. If the entrained material is abrasive the elbow 4 will tend to wear along its backside and eventually a hole or slot will form therein.

To combat the wear on the elbow 4 and to extend its usefulness, the elbow 4 is fitted with a plurality of liner segments 10 (FIG. 1), and these segments are positioned against the outside surface of the elbow 4 and extend along the entire backside thereof, thus forming a liner L across the back of the elbow 4. The liner segments 10 have their ends in close proximity and are joined to one another by intervening layers 12 of expoxy adhesive. They are further joined to the back surface of the elbow 4 by another layer 14 (FIG. 2) of epoxy adhesive. In addition, each segment 10 is secured to the elbow 4 by a separate steel band 16 which passes around both the segments 10 and the elbow 4.

The ends of each segment 10 are cut at an angle (FIG. 1) so that when the segments 10 are disposed along the backside of the elbow 4 the opposing ends of adjacent segments 10 lie parallel to one another. Stated differently, the angle of the end faces on the segments 10 is such that the planes in which they lie intersect at the center of curvature for the elbow 4.

It has been found that the 4 inches is the optimum length for the segments 10 used on pipe of nominal diameter ranging from 2 inches through 8 inches. This measurement is along the extreme backside of the segments 10, that is along the surface presented furthest from the radius of curvature for the pipe. In the circumferential direction, the segments should extend for about 180°.

The liner segments 10 are made from a wear resistant material, preferably one which is harder than the material scheduled to be conveyed through the transport system A. Aluminum oxide, zircon, and other wear resistant oxides are ideally suited for this purpose. Tungsten carbide and similar materials may also be used.

In a preferred method for producing the liner segments 10, a wear resistant material, which is initially moldable, is formed into a tubular shape 20 (FIGS. 3 and 4) the inside diameter of which is about equal to the outside diameter of the elbow 4. Most wear resistant materials of the ceramic and refractory variety, including aluminum oxide, are initially moldable. The moldable material may be built up around a cylindrical mandrel 22 to form the tubular shape 20. To impart sufficient body to the tubular shape 20 to enable segments subsequently cut therefrom to remain free standing, the moldable material should be pressed firmly against the mandrel 22. Isostatic pressing techniques are desirable.

Once the tubular shape 20 is derived, it is cut longitudinally along two axial slit lines 24 (FIGS. 3 and 4) spaced 180° apart to provide two semi-circular shapes 26. These semi-circular shapes 26 are then lifted away from the mandrel 22.

Thereafter, the semi-circular shapes 26 are cut crosswise at cross cuts 28 (FIG. 5) such that each semi-circular shape 26 is segmented, and the individual segments thereof possess the same size and configuration as the liner segments 10. The cuts 28 are not radial, but on the contrary, are oblique to the axis of the semi-circular shape 26. Indeed, each cut 28 is generally V-shaped with the apex of the cut being located away from the axial edge margins. The angles of the cuts 28 are such that the segment end faces formed thereby will be in planes which pass through the center of curvature for the elbow 4 when the segments 10 are placed against the backside of the elbow 4 (FIG. 1). Thus, the opposing end faces of adjacent liner segments 10 on the elbow 4 will be generally parallel. The distance between the cuts 28 at the backside of the shape 26 is approximately 4 inches for segments to be used on pipes sizes ranging from 2 inches to 8 inches nominal diameter.

Once the semi-circular shape 26 is segmented at the cross cuts 28, the individual segments so formed are subjected to whatever further processing is necessary to convert them into the liner segments 10. For example, if they are formed from a moldable ceramic or refractory material, they must thereafter be fired to become a hard ceramic product. In addition, it may be desirable to grind the end faces to bring them to the correct angle.

To install the liner segments 10 on the elbow 4 and create a liner L along the backside of that elbow 4, the elbow 4 is first cleaned to remove all dirt, scale, oil and other foreign material at least along the backside thereof. Next, any weld protrusions existing on the elbow 4 are ground flush. Thereafter, an epoxy cement is mixed and applied to the back surface of the elbow 4 and also to the inside or concave surfaces of the liner segments 10. More epoxy adhesive is applied to the end surfaces of the liner segments 10. Then the liner segments 10 are pressed against the backside of the elbow 4 and tapped slightly as they are installed to insure that they are firmly seated. The adhesive coatings on the end surfaces of adjacent liner segments join to form the layers 12 of epoxy adhesive between those liner segments 10, whereas the epoxy adhesive on the back surface of the elbow 4 and on the inside surfaces of the liner segments 10 join to form the layer 14 of epoxy adhesive. Finally, the steel bands 16 are applied around the liner segments 10 and the elbow 4 in the conventional manner. The bands 16 may be hose clamps.

Should the steel of the elbow 4 wear during operation of the pneumatic transport system A, the material being transported will impinge against the liner segments 10. Since these segments 10 are formed from an extremely hard material, the liner L will experience little if any wear and the elbow 4 will remain intact. Since the liner segments 10 are applied to the outside surface of the elbow 4, the pneumatic transport system A need not be dismantled to install the liner L as is true of ceramic and elastomeric liners of current design. Furthermore, an oversize elbow 4 is not required, but on the contrary, an elbow 4 compatible in size with the straight section of pipe 2 is used. Moreover, it is not necessary to erect a form about the elbow 4 as is necessary for concrete encasements, and therefore the liner L is much easier to install. Indeed, it may be installed in inconvenient and remote locations where it would be impossible to erect a concrete casing.

Similar liner segments may also be applied to the straight section of pipe 2, and this is sometimes desirable since some wear does occur in the straight pipe 2 immediately ahead of the elbow 4. Such similar liner segments would be made exactly the same as the liner segments 10, except that the cross cuts 28 in the semi-circular segments 26 would be radial instead of oblique.

Should one of the liner segments 10 eventually wear to the extent that it is no longer serviceable, it may be replaced with a new segment 10 without removing the entire liner L. Also, if the liner L initially applied to the elbow 4 is not long enough, it may be extended merely by installing additional segments 10. Hence, the liner L is enlarged without reconstructing it.

Aluminum oxide ($Al_2O_3$), due to its hardness, its abrasion resistant characteristics, is ideally suited for use in the segments 10.

This invention is intended to cover all changes and modifications of the example of the invention herein chosen for purposes of the disclosure which do not constitute departures from the spirit and scope of the invention.

What is claimed is:

1. A method of combating wear in a transport system including a curved section of pipe through which a fluid stream having solid material entrained therein is passed, said method comprising: placing individual liner segments formed from a wear-resistant material against the outside surface of the pipe along the backside of the curve therein with the end faces of adjacent segments being substantially aligned, substantially parallel and substantially in abutment, placing a layer of adhesive between the end faces of adjacent liner segments so that no voids exist between adjacent segments; leaving the opposite side of the outside pipe surface on the curve substantially exposed outwardly; and securing the segments firmly to the pipe by placing embracing members around the pipe and each of the liner segments so that no leakage will occur if a hole develops in the backside of the pipe.

2. A method according to claim 1 wherein the liner segments are further secured to the pipe by placing an adhesive between the pipe and liner segments.

3. In a transport system having a round pipe provided with a curved section therein and means for generating a high velocity fluid stream within the pipe so that solid material introduced into the pipe will become entrained in the fluid stream and will be conveyed through the pipe; the improvement comprising: individual liner segments having concave inside surfaces which are contoured to conform generally to the exterior contour of the backside of the pipe in the direction perpendicular to the direction of the flow through the pipe, the liner segments being preformed from a wear-resistant material, the segments being set end-to-end along the exterior surface of the backside of the curved section in the direction of flow through the curved section with end faces of adjacent segments being substantially aligned and substantially parallel, and an adhesive between the end faces of adjacent liner segments so that no voids exist between adjacent segments; and means for attaching the individual segments firmly to the pipe such that no leakage will occur if a hole develops in the backside of the pipe, said means including an adhesive between the pipe and liner segments and embracing members around the pipe and liner segments.

4. The structure according to claim 3 wherein the pipe is circular in cross section perpendicular to the direction of flow and the radius of the inside surface of the segments is substantially the same as the radius of the outside surface of the pipe.

5. The structure according to claim 4 wherein the concave inside surface of each segment is straight in the direction of flow through the pipe.

6. The structure according to claim 4 wherein the segments extend circumferentially across about 180° of the pipe surface.

7. The structure according to claim 3 wherein the means for attaching the liner segments to the pipe further comprises a band encircling each liner segment and the pipe.

8. The structure according to claim 3 wherein the liner segments are formed from a wear resistant ceramic material.

* * * * *